United States Patent [19]

Olsen

[11] 4,300,532
[45] Nov. 17, 1981

[54] METHOD AND APPARATUS FOR COLLECTING SOLAR ENERGY

[75] Inventor: Thomas O. Olsen, Wichita, Kans.

[73] Assignee: Otto Fabric, Inc., Sedgwick County, Kans.

[21] Appl. No.: 49,413

[22] Filed: Jun. 18, 1979

[51] Int. Cl.³ ............................................. F24J 3/02
[52] U.S. Cl. .................................. 126/417; 126/429; 126/449; 126/452; 126/901
[58] Field of Search ............... 126/428, 429, 417, 431, 126/446, 449, 450, 452; 165/48 S

[56] References Cited

U.S. PATENT DOCUMENTS

| | | | |
|---|---|---|---|
| 4,008,708 | 2/1977 | Hagarty | 126/901 X |
| 4,086,909 | 2/1978 | Lyon et al. | 126/432 |
| 4,121,565 | 10/1978 | Grisbrook | 126/442 |
| 4,126,270 | 11/1978 | Hummel | 126/432 |

*Primary Examiner*—Larry Jones

*Attorney, Agent, or Firm*—Lowe, Kokjer, Kircher, Wharton & Bowman

[57] ABSTRACT

A method and device for collecting solar energy is the subject of this application. A glass cloth coated with a light absorbing resinous material is utilized as the collector panel. A glass cloth coated with a translucent resinous material is the preferred material for a cover panel that is disposed in spaced relationship to the collector panel. A framework holds the two cloth layers in spaced planar relationship and a heat exchange medium is placed in contact with the collector panel. The device is used by placing it in direct sunlight, preferably at an angle to maximize the effects of the solar radiation. Radiation striking the light absorbing glass cloth is quickly dissipated by the glass fibers thereby heating the transfer medium. The resinous material, preferably black for the collector panel, provides a highly absorptive surface for the solar radiation and also protects the glass fiber of the cloth from deterioration as a result of radiation or corrosion.

8 Claims, 5 Drawing Figures

U.S. Patent   Nov. 17, 1981   4,300,532
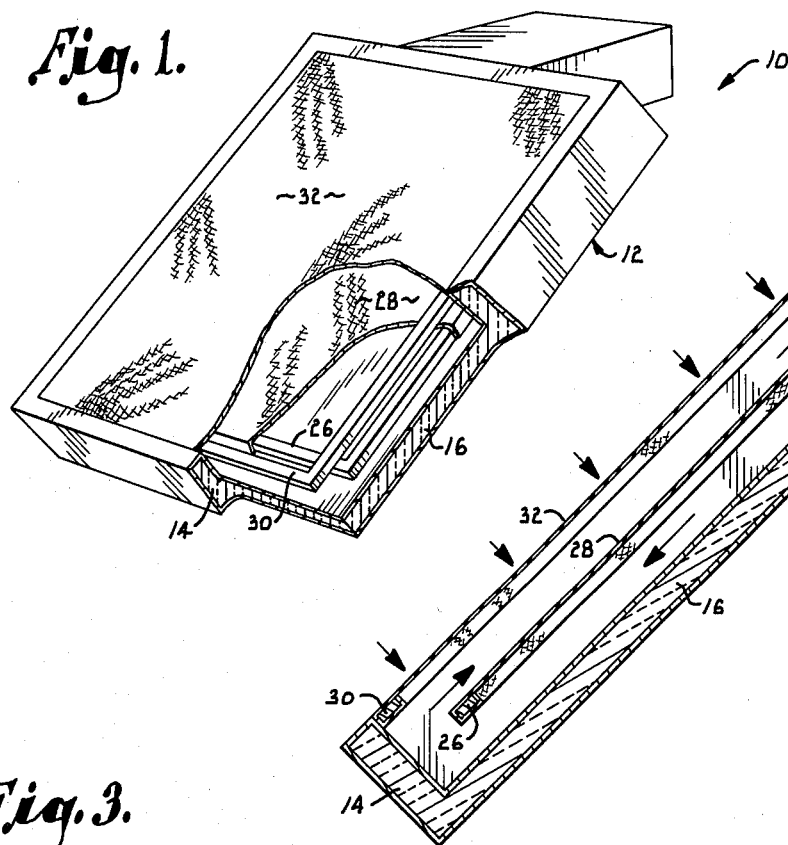
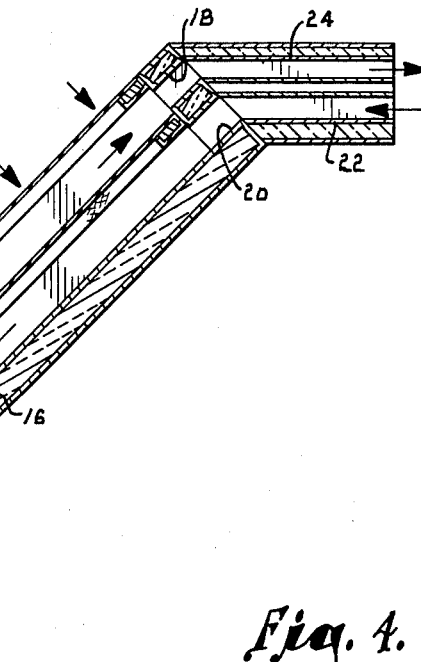
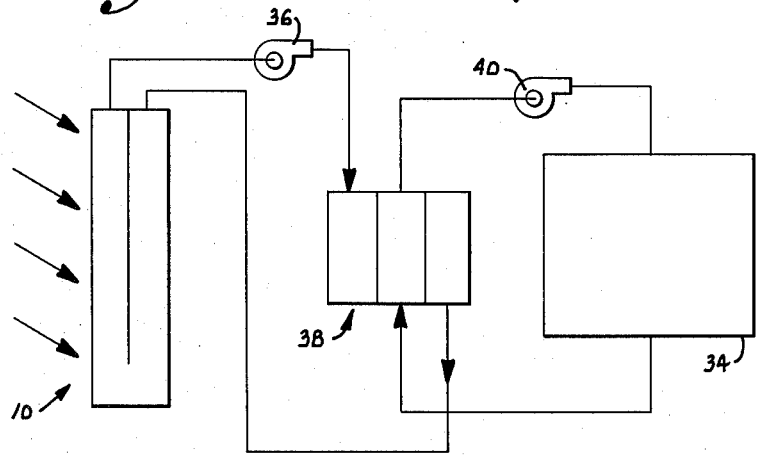
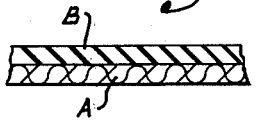
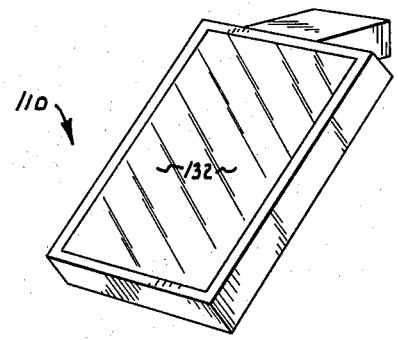

METHOD AND APPARATUS FOR COLLECTING SOLAR ENERGY

This invention relates to solar collectors and, more particularly, to a method and device for collecting solar energy employing a resinous coated fiber glass cloth.

With the increasing emphasis on energy conservation, solar collectors are becoming more and more popular. While there have been prior efforts to utilize fibrous materials in collectors, these prior efforts have concentrated on ferrous metals such as steel wool, painted black. Such material has not proved to be noticeably more effective than a conventional metal panel painted black.

With all of the prior art devices keeping a black coating on a metal surface has proved to be a substantial maintenance problem. Also, the need to employ thick insulating glass for a cover panel is expensive, results in a very heavy collector, and requires great care to minimize breakage of the glass.

It is, therefore, a primary object of the present invention to provide a method and device for collecting solar energy which utilizes a more efficient material to collect solar radiation and transfer it to a heat transfer medium.

As a corollary to the above object, a primary aim of this invention is to provide a solar collector employing a collector panel providing for more efficient dissipation of collected energy.

Another important aim of the invention is to provide a method and device for collecting solar energy which employs a collector panel that eliminates any problem of oxidation or corrosion heretofore associated with metal collector panels.

As a corollary to the aim immediately preceding, an important objective of this invention is to provide a solar collector which can be used for heating chlorine treated water without any attendant corrosion problem.

Still another important object of the invention is to provide a method and device for collecting solar energy which eliminates the problem of keeping black paint on a metal surface.

Still another objective of the invention is to provide a method and device for collecting solar energy which is lighter in weight than collectors employing metal and glass, thereby reducing the structural requirements for supporting the collector and also reducing shipping costs.

It is also an objective of the invention to provide a method and device for collecting solar energy which eliminates the use of all glass in the collector, thereby reducing the cost and eliminating the problem of glass breakage in both transportation and usage.

One of the objects of the invention is to provide a method and device for collecting solar energy which eliminates the need for an expensive insulated glass cover panel by providing for more efficient dissipation of energy collected thereby reducing the amount of energy potentially to be lost through the cover panel.

Still another aim of the present invention is to eliminate the requirement of glazing the cover panel for a solar collector by providing for more efficient dissipation of energy away from the collector plate, thereby reducing the amount of energy which could escape through the cover panel.

Other objects of the invention will be made clear or become apparent from the following description and claims when read in light of the accompanying drawing wherein:

FIG. 1 is a perspective view of one form of collector device of the present invention;

FIG. 2 is a vertical cross-sectional view taken through the device of FIG. 1;

FIG. 3 is a schematic illustration of a solar heating system for an enclosure employing the present invention;

FIG. 4 is an enlarged cross-sectional view of the resinous coated glass cloth employed in the present invention; and FIG. 5 is a perspective view of an alternative form of the invention.

Referring initially to FIG. 1, the device of the present invention is designated generally by the numeral 10. Collector 10 comprises a generally rectangular framework 12 having three sides 14 constructed of insulated material along with a bottom 16. The fourth side of the rectangular framework provides openings 18 and 20 which communicate with insulated feed and return ducts 22 and 24, respectively.

Framework 12 also comprises an inner support frame 26 over which is tightly fitted a collector panel 28. Framework 12 also comprises an upper support frame 30 over which is tightly fitted a translucent cover panel 32.

The preferred construction of both collector panel 28 and cover panel 32 is illustrated in FIG. 4. In this fig., the letter A designates a woven glass fiber cloth and the letter B represents a resinous coating for the cloth. It has been found that, by using the glass cloth in the collector panel 28, the energy absorbed by the panel is dissipated at a much faster rate than with metal collectors. This results in a greater amount of energy being transferred to the heat transfer medium which is in contact with the panel. The glass cloth should comprise fibers of a size large enough to present sufficient surface area to readily dissipate the energy striking the panel.

The resinous coating B may be any suitable material which will adhere to the glass cloth A and protect the cloth from deterioration as a result of exposure to the sun's rays as well as the corrosive action of the atmosphere, water and other liquids. Suitable materials for coating the glass cloth A include tetrafluoroethylene, polyethylene, polyvinylchloride, neoprene, styrene, butyl rubber, and silicone rubber.

The preferred material for coating glass cloth A is silicone rubber which has the desired physical properties and is also easy to apply by various techniques including dip coatings, spraying and calendering. The term "silicone rubber" is meant to include any poly siloxane which has been cross linked. Most silicone rubbers are predominantly methyl poly siloxane but the polymer may also contain other organic group substituents on the polymer chain such as phenol or vinyl. The most predominantly used cross linking agents for heat cured silicone rubbers are organic peroxides, especially benzoyl peroxide and its derivatives. A number of silicone rubbers are disclosed in U.S. Pat. No. 2,448,756 which is incorporated herein by reference. A suitable product is dimethyl polysiloxane having a molecular weight of about 500,000. Silicone rubber products suitable for usage in the process of the present invention include those sold by the General Electric Company under the designations SE-44U, SE-88U, SE-546U, SE-547U, SE-458U, SE-4815U, SE-5549U, SE-4524U, SE-5554U, SE-4624U, SE-5206U, SE-4527U, SE- 3803U, SE-3808U, SE-7501U, SE-3717U, SE-3713U, SE-3613U, SE-4404U, SE-5211U, SE-5553U, and SE-517U.

In the preferred embodiment of the invention the silicone rubber employed is a room temperature vulcanizing (RTV) silicone. Exemplary RTV silicone rubbers which may be utilized with the present invention are those sold by the General Electric Company under the product designations RTV-102, RTV-103, RTV-108, RTV-109, RTV-106, RTV-116, RTV-118, RTV-112, RTV-511, RTV-560, RTV-602, RTV-615, RTV-616, RTV-630, RTV-631, and RTV-632.

The woven glass fabric is treated prior to coating with an anit-wicking liquid such as silane. A suitable coating liquid to impart anti-wicking properties to the cloth is a silane sold by Union Carbide Company and designated as its product Al-72. Another suitable coating product is a silane sold by Burlington Glass Fabric Company and designated as its product BGFI-518.

The resinous coating is preferably applied at a thickness of 2-10 mils. While in most instances it will be necessary to only coat one side of the cloth A, if a corrosive liquid is utilized as the heat transfer medium, both sides of the cloth will be coated with 2-10 mils of the resinous material for a total coating thickness of 4-20 mils.

It is to be understood that the coated cloth shown in FIG. 4 is representative of both collector panel 28 and cover panel 32. In both cases the fabric A is woven glass as described above. The resinous layer B is the same for both panels except that a pigment is added in the case of collector panel 28 to impart a dark color to the panel. In most instances the desired color will be black for maximum absorptivity.

FIG. 3 is a schematic illustration of the manner in which the device of the present invention would be utilized to heat an enclosure which has been designated by the numeral 34. A fan 36 circulates the heat transfer medium, which is air, through collector device 10 and passes the heated air to a storage area 38. It will be appreciated that storage area 38 may be filled with rock or a liquid which will undergo a change in physical state as it cools down thereby enhancing its storage capability. A second fan 40 circulates a heat exchange medium, which is air, through the storage area 38 and into the conditioned space of enclosure 34.

In FIG. 5 an alternative embodiment of the invention is designated generally by the numeral 110. The device 110 is identical in construction to the device 10 described above except that a glass pane 132 has been substituted for cover panel 32. The glass pane is generally not as desirable as the resinous covered glass cloth 32 but in some existing solar collectors the construction cannot be easily modified to accommodate the glass cloth. Thus, the collector panel 28 could be utilized inside the device 110 while still retaining the glass cover plate 132.

Set forth below in Table I is a comparison between silicone coated glass cloth and black aluminum collector panels, in terms of temperature rise.

TABLE I

| Time (in minutes) | Temperature Rise As A Function of Time | |
| --- | --- | --- |
| | Black Aluminum temperature (°F.) | Silicone Coated Fiberglass (°F.) |
| 0 | 76 | 76 |
| 1 | 79 | 84 |
| 2 | 82 | 90 |
| 3 | 86 | 100 |
| 4 | 90 | 106 |
| 5 | 94 | 110 |
| 6 | 97 | 115 |
| 7 | 100 | 118 |

Utilizing the first law of thermodynamics, it may be shown that the ratio of total collected energy between two collectors of the same construction is directly proportional to the temperature rise in the collectors. This assumes the same mass of air in both collectors and the same minimal amount of heat loss in both insulated collectors.

Table II is comparative data for a collector utilizing the silicone coated glass cloth versus black aluminum as the collector panel. With both collectors there was no air flow through the collector:

TABLE II

| Time (minutes) | ENERGY COLLECTED VERSUS TIME Ratio of Energy Collected Glass Cloth: Aluminum |
| --- | --- |
| 1 | 3 |
| 2 | 2.5 |
| 3 | 2.5 |
| 4 | 2.4 |
| 5 | 2.3 |
| 6 | 2.2 |
| 7 | 2.2 |
| 8 | 2.2 |

Having thus described my invention, I claim:

1. A solar collector comprising:
a framework; and
a collector panel held in a planar position by said framework and comprising a glass cloth coated with a light absorbing room temperature vulcanizing silicone rubber.

2. The invention of claim 1, wherein is include a translucent cover panel supported in a planar position by said framework and disposed in upwardly spaced relationship relative to said collector panel.

3. The invention of claim 2, wherein said cover panel comprises glass cloth coated with room temperature vulcanizing silicone rubber.

4. The invention of claim 1, wherein is included a heat exchange medium in contact with said collector panel.

5. A solar collector comprising:
a framework;
a collector panel comprising a woven glass cloth coated with a black colored room temperature vulcanizing silicone rubber, said collector panel being held in a planar position by said framework;
a translucent cover panel supported in a planar position by said framework and disposed in upwardly spaced relationship relative to said collector panel; said cover panel comprising a woven glass cloth coated with a room temperature vulcanizing silicone rubber; and a heat exchange medium in contact with said collector panel.

6. A method of collecting solar energy comprising:

providing a glass cloth coated with a light absorbing room temperature vulcanizing silicone rubber;

placing said cloth in a location to receive direct sunlight; and placing a heat exchange medium in contact with said cloth.

7. A method as set forth in claim 6, wherein is included the step of placing a cover panel over said glass cloth in spaced relationship to the cloth.

8. A method as set forth in claim 7, wherein the step of placing a cover panel comprises placing a second glass cloth coated with a translucent room temperature vulcanizing silicone rubber.

* * * * *